(12) United States Patent
Majidi et al.

(10) Patent No.: US 9,826,379 B2
(45) Date of Patent: Nov. 21, 2017

(54) METHODS AND SYSTEMS FOR FACILITATING SUBSIDIZED ACCESS BY A USER TO NETWORK CONTENT

(71) Applicant: Verizon Patent and Licensing Inc., Arlington, VA (US)

(72) Inventors: Gilda Majidi, San Jose, CA (US); Momin Mirza, Santa Clara, CA (US); Kiran Naiga, Mountain View, CA (US); Suresh Venkateswaran, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 84 days.

(21) Appl. No.: 14/868,569

(22) Filed: Sep. 29, 2015

(65) Prior Publication Data
US 2017/0094492 A1 Mar. 30, 2017

(51) Int. Cl.
*H04W 4/24* (2009.01)
*H04M 15/00* (2006.01)
*G06Q 30/02* (2012.01)

(52) U.S. Cl.
CPC .......... *H04W 4/24* (2013.01); *G06Q 30/0267* (2013.01); *H04M 15/8083* (2013.01); *H04M 15/83* (2013.01); *H04M 2215/0192* (2013.01)

(58) Field of Classification Search
CPC ..... H04W 4/24; G06C 30/0267; H04M 15/83
See application file for complete search history.

(56) References Cited

U.S. PATENT DOCUMENTS

| | | | | |
|---|---|---|---|---|
| 2010/0223096 A1* | 9/2010 | Bosan | .................... | G06Q 30/02 705/14.64 |
| 2011/0065423 A1* | 3/2011 | Karaoguz | .............. | G06Q 30/02 455/414.2 |
| 2014/0280758 A1* | 9/2014 | Sharma | ................. | H04W 4/021 709/219 |
| 2014/0370846 A1* | 12/2014 | Neal | ..................... | H04M 15/09 455/406 |
| 2014/0370847 A1* | 12/2014 | Neal | ..................... | H04M 15/61 455/406 |
| 2015/0172899 A1* | 6/2015 | Sharma | ............. | H04M 15/8083 455/406 |
| 2015/0242903 A1* | 8/2015 | Peebles | .............. | G06Q 30/0267 705/14.64 |

\* cited by examiner

*Primary Examiner* — Nathan Mitchell

(57) ABSTRACT

An exemplary method includes a subsidized access management system detecting a request provided by a user of an access device for the user to receive subsidized access to network content, identifying a plurality of user parameters provided by the user and that define a plurality of conditions associated with the subsidized access to the network content and that the user is willing to experience in order to receive the subsidized access to the network content, selecting a sponsor from a pool of potential sponsors and that is willing to sponsor the subsidized access to the network content in accordance with the plurality of user parameters, and providing the user with the subsidized access to the network content by way of the access device in accordance with a subsidized access arrangement between a subsidized access provider and the sponsor. Corresponding systems and methods are also described.

20 Claims, 11 Drawing Sheets 602-1 — 1) Choose format you are willing to sponsor:
- ☑ Videos
- ☐ Full websites
- ☐ Objects 602-2 — 2) Total data usage per sponsorship not to exceed:
300 MB 602-3 — 3) My ad links:
http://...

602-4 — 4) Maximum budget per sponsorship:
$6.50

602-5 — 5) Minimum percentage of ad time over content:
8%

602-6 — 6) Select time of day to sponsor:
From: 10 AM  To: 4 PM 602-7 — 7) Choose resolution(s) you are willing to sponsor:
- ○ SD
- ● HD

Fig. 6

METHODS AND SYSTEMS FOR FACILITATING SUBSIDIZED ACCESS BY A USER TO NETWORK CONTENT

BACKGROUND INFORMATION

Network service providers (e.g., wireless carriers, Internet service providers, etc.) often charge users to access network content by way of the providers' networks based on the amount of data that the users utilize while accessing the network content. For example, a network service provider may impose a maximum data usage amount per billing period (i.e., a data usage quota) with excess data usage being billed separately, charge a predetermined amount per unit of data usage (e.g., when a wireless device user is roaming on another wireless network), or allow a user to pre-pay for a predetermined amount of data usage.

Unfortunately, maximum data limits may deter a user from accessing network content, especially in cases where the user must budget data usage in order to avoid incurring additional charges. Many such users may refrain from accessing network content (e.g., a mobile device application, image content, video content, advertisement content, and other potentially high-bandwidth network content) because they do not want access to such content to count against their predetermined data usage limits and/or because they do not want to pay for the data used in accessing such network content.

Hence, if a user could receive subsidized access to network content (i.e., if a sponsoring entity were to pay for at least a portion of the data that is used to access the network content), many such users would be willing to experience advertisement content together with the network content, even if the network content does not normally include advertisements. However, the quantity, type, and/or duration of advertisements that each user in a group of users would be willing to experience in exchange for subsidized access to the network content may vary significantly from user to user. For example, a first user who is close to exceeding his or her predetermined data usage limit may be much more willing to experience a relatively high duration of advertisement content in order to access network content than a second user who is not close to exceeding his or her predetermined data usage limit.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 4-8 illustrate exemplary graphical user interfaces according to principles described herein.

DETAILED DESCRIPTION OF PREFERRED EMBODIMENTS

Figure 1:
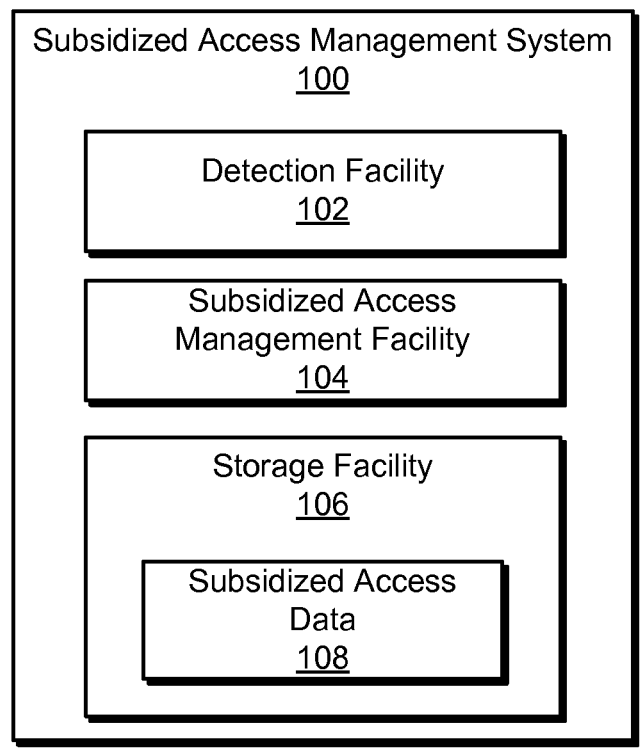
FIG. 1 illustrates an exemplary subsidized access management system according to principles described herein.

Methods and systems for facilitating subsidized access by a user to network content are described herein. For example, as will be described below, a subsidized access management system associated with a subsidized access provider may detect a request provided by a user of an access device for the user to receive subsidized access to network content by way of the access device. The subsidized access management system may identify a plurality of user parameters provided by the user and that define a plurality of conditions associated with the subsidized access to the network content and that the user is willing to experience in order to receive the subsidized access to the network content. The subsidized access management system may select, based on the user parameters, a sponsor from a pool of potential sponsors and that is willing to sponsor the subsidized access to the network content by the user by way of the access device in accordance with the plurality of user parameters, and then provide the user with the subsidized access to the network content by way of the access device in accordance with a subsidized access arrangement between the subsidized access provider and the sponsor.

To illustrate, a user may desire to view an online video on his or her smartphone while the smartphone operates on a mobile network provided by a mobile network service provider. Unfortunately, the user may be nearing a maximum monthly data limit allowed by the user's service contract with the service provider, and may therefore be reluctant to access the online video. However, in accordance with the methods and systems described herein, a "sponsor me" link may be displayed near a link for the online video. The user may select the "sponsor me" link and then specify various conditions that the user is willing to experience in order to receive subsidized access to the online video.

In response to the user specifying the various conditions the user is willing to experience in exchange for subsidized access to the online video, the methods and systems described herein may select a sponsor that is willing to sponsor the subsidized access by the user to the online video in accordance with the conditions specified by the user. The methods and systems described herein may notify the user that the sponsor has been selected and then provide the user with subsidized access to the online video in accordance with a subsidized access arrangement between the subsidized access provider and the sponsor.

The methods and systems described herein may allow a subsidized access provider to facilitate subsidized access to network content by a user based on user-provided parameters. Subsidized access to network content may encourage or incentivize a user to access the network content, thereby providing content providers and/or their network content with increased exposure, traffic, and/or revenue. Likewise, subsidized access to network content may allow a user to experience and enjoy network content that he or she may not otherwise choose to access due to the typical data usage charges associated therewith. The subsidized access provided in accordance with the methods and systems described herein may also allow a sponsor to provide advertisements to a captive and willing audience.

As used herein, "network content" refers to any data, service, or content (e.g., Internet content) that may be accessed by way of a network. For example, network content may include, but is not limited to a website, a network-based application (e.g., an application configured to be executed by a mobile device), a network-based service (e.g., an email service, a global positioning service ("GPS") service, a navigation service, etc.), advertisement content (e.g., web-based advertisements, banner advertisements, pop-up advertisements, etc.), media content (e.g., video and/or audio content), and/or any other type of content accessible by way of a network as may serve a particular implementation. Network content to which access is subsidized may be referred to herein as "subsidized network content," "sponsored network content," and/or "sponsored data."

As used herein, a "subsidized access provider" may include any entity configured to provide one or more network access services (e.g., wireless data access services) to a user (e.g., a subscriber) and to facilitate subsidized access to network content by the user. For example, a subsidized access provider may include, but is not limited to, a wireless carrier, a wireless network provider, an Internet service provider, a subscriber television service provider, and/or any other type of provider of network access services as may serve a particular implementation.

As used herein, a "content provider" may include any entity or person that provides network content for access by a user. For example, a content provider may be a website provider, a mobile application provider, etc. In some examples, a content provider may also serve as a sponsor for the content provider's own network content. Alternatively, the content provider may not be the same entity as a sponsor of the content provider's network content.

As used herein, a "sponsor" may include any entity or person (e.g., an entity or person other than the subsidized access provider associated with network content) that may subsidize (i.e., pay for all or a portion of) access to the network content. For example, a sponsor may include, but is not limited to, a website owner, an application developer, an application provider, an advertisement provider, and/or a business. A sponsor may sponsor subsidized access by a user to network content in any suitable manner. For example, the sponsor may pay for all or part of the data usage charge associated with the user accessing the network content in accordance with a subsidized access arrangement between the sponsor and the subsidized access provider. In this manner, the user may access the network content for free or at a reduced cost. A sponsor may additionally or alternatively sponsor subsidized access by reducing (e.g., eliminating) an amount of data that is counted against a user's data usage quota while the user accesses the network content, paying for a refund of all or part of the data usage charge to the user, and/or paying for an upgrade in a quality of service (e.g., speed) for the data used to access the network content free-of-charge to the user.

FIG. 1 illustrates an exemplary subsidized access management system 100 ("system 100") configured to facilitate subsidized access by a user to network content. As shown, system 100 may include, without limitation, a detection facility 102, a subsidized access management facility 104 ("management facility 104"), and a storage facility 106 selectively and communicatively coupled to one another. It will be recognized that although facilities 102-106 are shown to be separate facilities in FIG. 1, any of the facilities 102-106 may be combined into fewer facilities, such as into a single facility, or divided into more facilities as may server a particular implementation.

Storage facility 106 may maintain subsidized access data 108 generated and/or used by detection facility 102 and/or management facility 104. For example, as will be described below, subsidized access data 108 may include, but is not limited to, data representative of user-provided parameters for receiving subsidized access to network content, sponsor-provided parameters for providing subsidized access to network content, a set of sponsorship criteria, a subsidized access arrangement, tracked data usage, etc. Storage facility 106 may maintain additional or alternative data as may serve a particular implementation.

Detection facility 102 may detect a request provided by a user of an access device (e.g., a smartphone, a tablet computer, etc.) for the user to receive subsidized access to network content by way of the access device. In some examples, the network content may be associated with (e.g., provided by) a content provider and maintained by a content provider system that is separate from system 100. Exemplary manners in which detection facility 102 may detect the request provided by the user of the access device to receive the subsidized access to the network content by way of the access device will be described below.

Management facility 104 may perform one or more subsidized access management operations. For example, in response to a request provided by a user to receive subsidized access to network content by way of an access device, management facility 104 may identify a plurality of user parameters provided by the user and that define a plurality of conditions associated with the subsidized access to the network content and that the user is willing to experience in order to receive the subsidized access to the network content. The plurality of user parameters that define the plurality of conditions the user is willing to experience may include, for example, a parameter that specifies a resolution of network content that the user is willing to experience in order to receive the subsidized access to the network content, a parameter that specifies a maximum number of advertisements that the user is willing to experience (e.g., view and/or listen to) in order to receive the subsidized access to the network content, a parameter that specifies a total length of advertisements that the user is willing to experience in order to receive the subsidized access to the network content, a parameter that specifies a type of sponsor that the user is willing to have sponsor the subsidized access to the network content, a parameter that specifies a specific potential sponsor that the user is willing to have sponsor the subsidized access to the network content, and/or any other type of parameter associated with the subsidized access as may serve a particular implementation. Various user parameters will be described in more detail below. Exemplary manners in which management facility 104 may identify the plurality of user parameters will also be described below.

Based on the plurality of user parameters, management facility 104 may select a sponsor, from a pool of potential sponsors, that is willing to sponsor the subsidized access to the network content by the user by way of the access device in accordance with the plurality of user parameters. In some examples, as will be described in more detail below, the selection of the sponsor may also be based on sponsorship criteria provided by the subsidized access provider, a plurality of sponsor parameters provided by each potential sponsor within the pool of potential sponsors, and/or other factors as may serve a particular implementation. Exemplary manners in which management facility 104 may select the sponsor from the pool of potential sponsors will be described below.

Once management facility 104 has selected the sponsor from the pool of potential sponsors, management facility 104 may provide the user with the subsidized access to the network content by way of the access device in accordance with a subsidized access arrangement between the subsidized access provider and the sponsor. The subsidized access arrangement may include any suitable agreement, contract, and/or other arrangement in which the sponsor has agreed to subsidize access by one or more users to network content. To illustrate, an exemplary subsidized access arrangement may specify that a sports equipment company agrees to subsidize access to an online broadcast of a sporting event by a user who accesses the broadcast by way of a subsidized access provider's network in exchange for the sports equipment company providing advertising content that the subsidized access provider will transmit to the user. It will be recognized that other subsidized access arrangements between any type of sponsor and any type of subsidized access provider may be realized in accordance with the methods and systems described herein. Exemplary manners in which management facility 104 may provide the user with the subsidized access to the network content will be described below.

Figure 2:
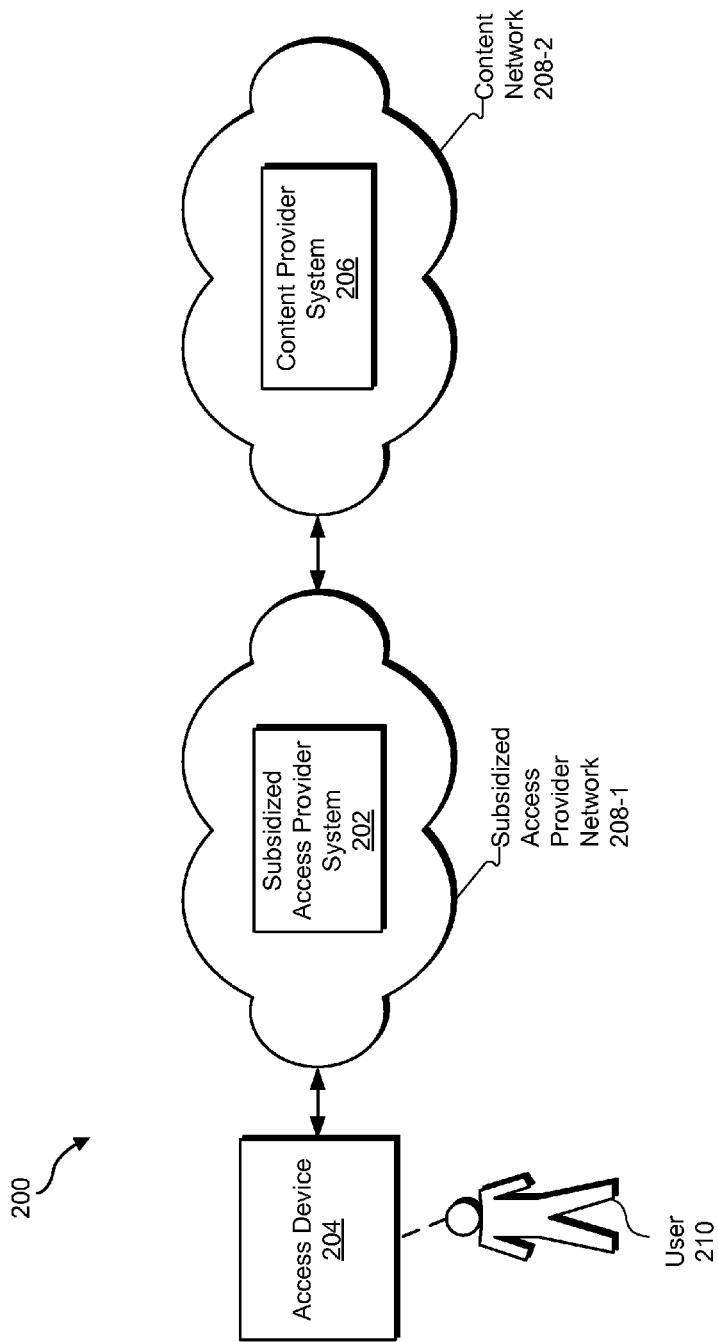
FIG. 2 illustrates an exemplary configuration in which the subsidized access management system of FIG. 1 is entirely implemented by a subsidized access provider system according to principles described herein.

FIG. 2 illustrates an exemplary configuration 200 in which system 100 is entirely implemented by a subsidized access provider system 202. As shown, configuration 200 may also include an access device 204 (e.g., a smartphone, a tablet computer, etc.) and a content provider system 206. Subsidized access provider system 202 is associated with (i.e., located within) a subsidized access provider network 208-1 and content provider system 206 is associated with (i.e., located within) a content network 208-2. Each of these elements will now be described in detail.

Access device 204 may be configured to facilitate access by a user 210 to network content associated with (e.g., provided by) content provider system 206. To this end, as will be described below, access device 204 may communicate with content provider system 206 by way of service provider network 208-1 and content network 208-2. Access device 204 may be implemented by any suitable access device, such as a mobile or wireless device (e.g. a smartphone and/or a tablet computer), a personal computer, a set-top box device, a digital video recorder ("DVR") device, a personal digital assistant device, a gaming device, a television device, and/or any other suitable computing device configured to access network content.

Subsidized access provider system 202 may be associated with (e.g., provided and/or managed by) a subsidized access provider (e.g., a network service provider) and may be configured to provide one or more network access services (e.g., wireless data access services) to access device 204. For example, subsidized access provider system 202 may manage (e.g., track, allow, disallow, route, etc.) network traffic (i.e., data) that flows through subsidized access provider network 208-1. To this end, subsidized access provider system 202 may be implemented by one or more gateways, routers, servers (e.g., domain name system ("DNS") servers and/or billing management servers), and/or other network components as may serve a particular implementation.

Content provider system 206 may be associated with (e.g., provided and/or managed by) any suitable network content provider and may be configured to provide network content that may be accessed by access device 204. Hence, content provider system 206 may be implemented by any combination of computing devices (e.g., servers) as may serve a particular implementation.

Access device 204, subsidized access provider system 202, and content provider system 206 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

As shown, access device 204, subsidized access provider system 202, and content provider system 206 may communicate by way of service provider network 208-1 and content network 208-2. Subsidized access provider network 208-1 may include any provider-specific network (e.g., a wireless carrier network or a mobile telephone network). Content network 208-2 may include a content provider-specific network, the Internet, or any other suitable network associated with content provider system 206. Data may flow between service provider network 208-1 and content network 208-2 using any suitable communication technologies, devices, media, and protocols as may serve a particular implementation.

While two interconnected networks 208-1 and 208-2 (collectively "networks 208") are shown in FIG. 2, it will be recognized that networks 208 may be combined into a single network in accordance with the methods and systems described herein. Likewise, it will be recognized that access device 204 may access network content by way of more than two interconnected networks in accordance with the methods and systems described herein as may serve a particular implementation.

Figure 3:
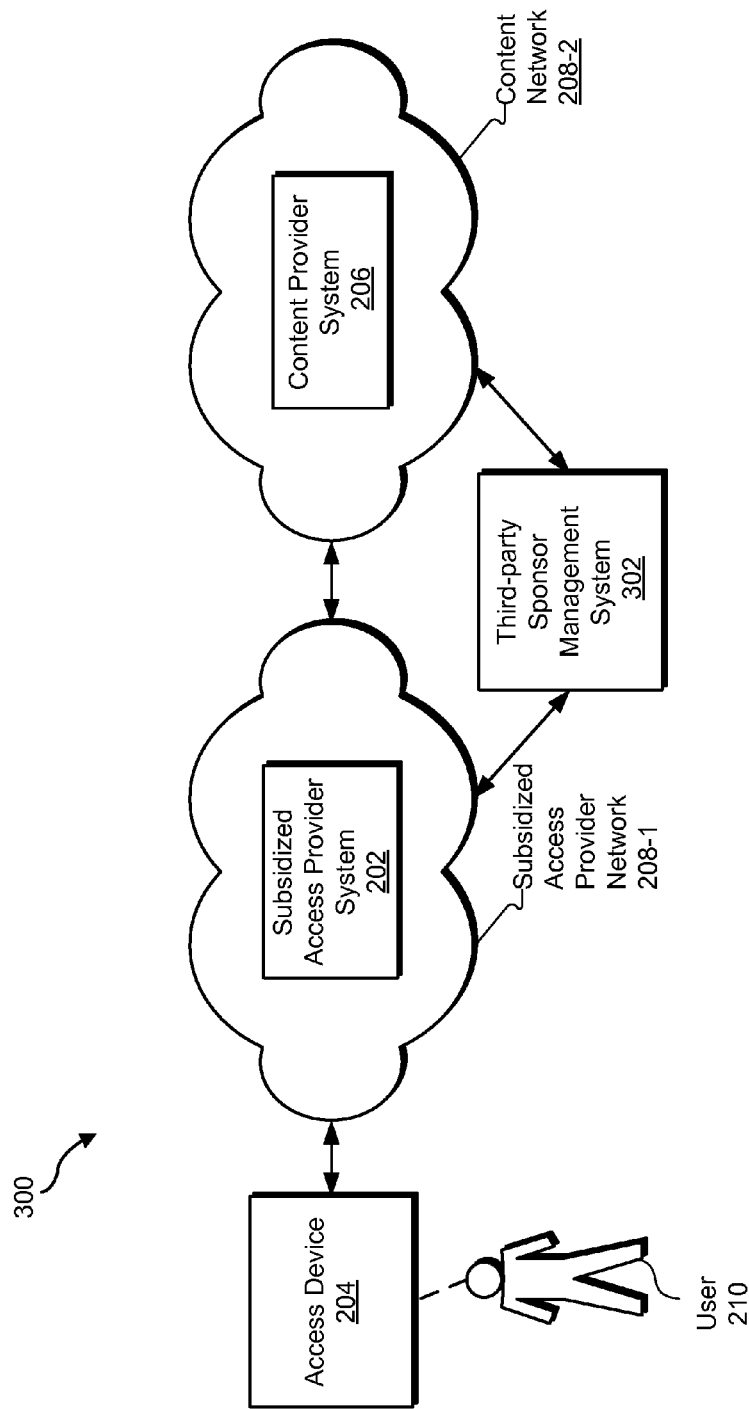
FIG. 3 illustrates another exemplary configuration in which the subsidized access management system is implemented by a third-party sponsor management system according to principles described herein.

FIG. 3 illustrates another exemplary configuration 300 in which system 100 is implemented by a third-party sponsor management system 302 ("third-party system 302"). Third-party system 302 may perform any operation associated with providing subsidized access by a user to network content. Hence, third-party system 302 may be implemented by any suitable combination of one or more computing devices. For example, third-party system 302 may be implemented by one or more servers (e.g., proxy servers).

Third-party system 302 may be managed by a third party entity separate from the network service provider and the content provider. In this configuration, third-party system 302 may be used to provide subsidized access to network content by way of various different service provider networks (e.g., by way of various different wireless network carrier networks).

As shown, third-party system 302 may be communicatively coupled to both subsidized access provider network 208-1 and to content network 208-2. However, it will be recognized that third-party system 302 may alternatively be communicatively coupled only to (i.e., a part of) either subsidized access provider network 208-1 or content network 208-2.

In some examples, system 100 is entirely implemented by third-party system 302. Alternatively, system 100 may be implemented by third-party system 302 and subsidized access provider system 202.

Exemplary manners in which system 100 may facilitate subsidized access to network content based on user-provided parameters will now be described.

As mentioned, system 100 may detect a request provided by a user (e.g., user 210) of an access device (e.g., access device 204) for the user to receive subsidized access to network content by way of the access device. The user may provide the request in any suitable manner.

Figure 4:
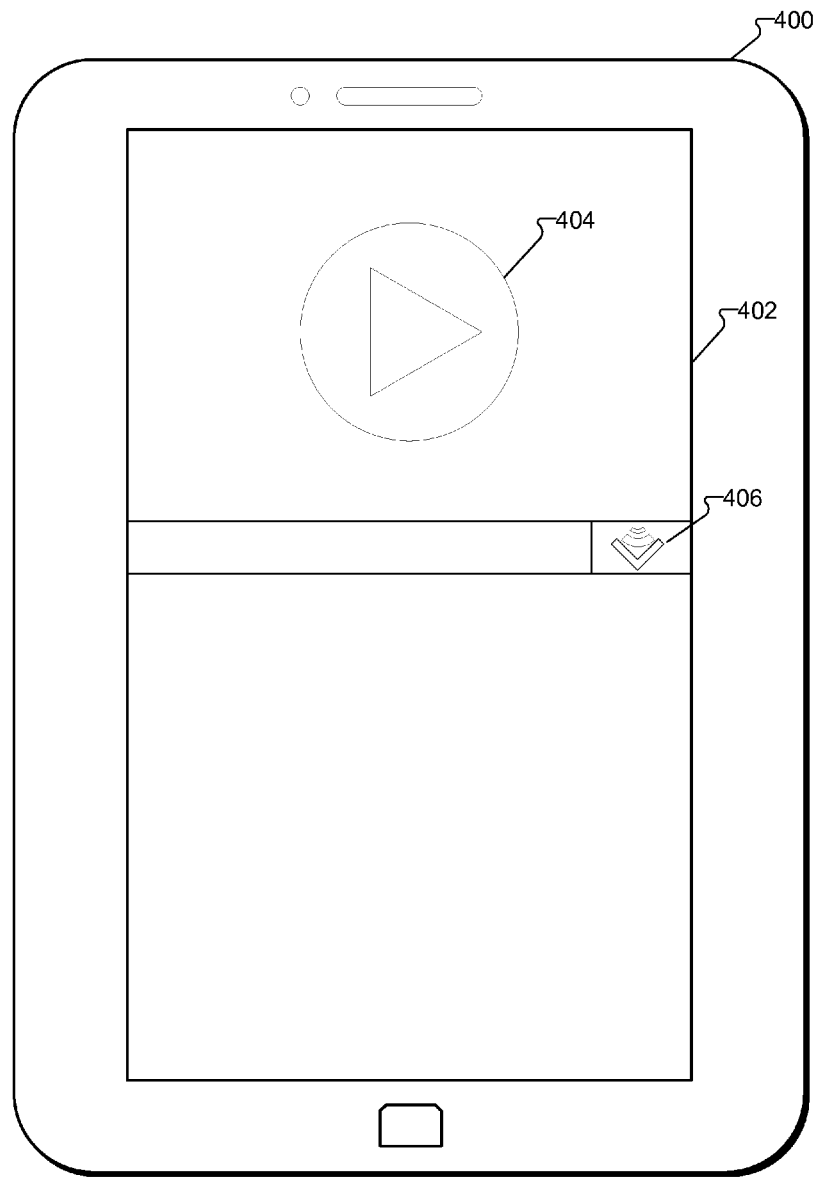

For example, FIG. 4 shows an exemplary access device 400 that a user may use to access network content. As shown, access device 400 may display a GUI 402 (e.g., a web browser or a mobile application) within which a display element 404 may be presented. Display element 404 is linked to network content, which in this particular example, may include an online video. A user may select display element 404 to access (e.g., view) the network content.

In some examples, as shown in FIG. 4, an additional display element 406 may be concurrently presented with display element 404 within GUI 402. Display element 406 is representative of a selectable option to request to receive subsidized access to the network content associated with display element 404. The user may provide a request to receive subsidized access to the network content associated with display element 404 by first selecting display element 406. If, on the other hand, the user were to select display element 404 without first selecting display element 406, the user would not receive subsidized access to the network content and would instead be responsible for any data usage charges incurred by accessing the network content.

It will be recognized that the user may provide the request to receive subsidized access to the network content in any other manner. For example, the user may select a link for network content. In response, system 100 may provide a notification to the user that asks the user if the user wants to receive subsidized access to the network content. The user may then select an option displayed within the notification that indicates that the user does desire to receive subsidized access. However, for purposes of the examples provided herein, it will be assumed that the user provides the request for subsidized access to the network content by selecting display element 406 prior to selecting display element 404.

System 100 may detect a selection by the user of display element 406 and, in response, identify a plurality of user parameters provided by the user and that define a plurality of conditions associated with the subsidized access to the network content and that the user is willing to experience in order to receive the subsidized access to the network content. The user may provide the user parameters in any suitable manner.

Figure 5:
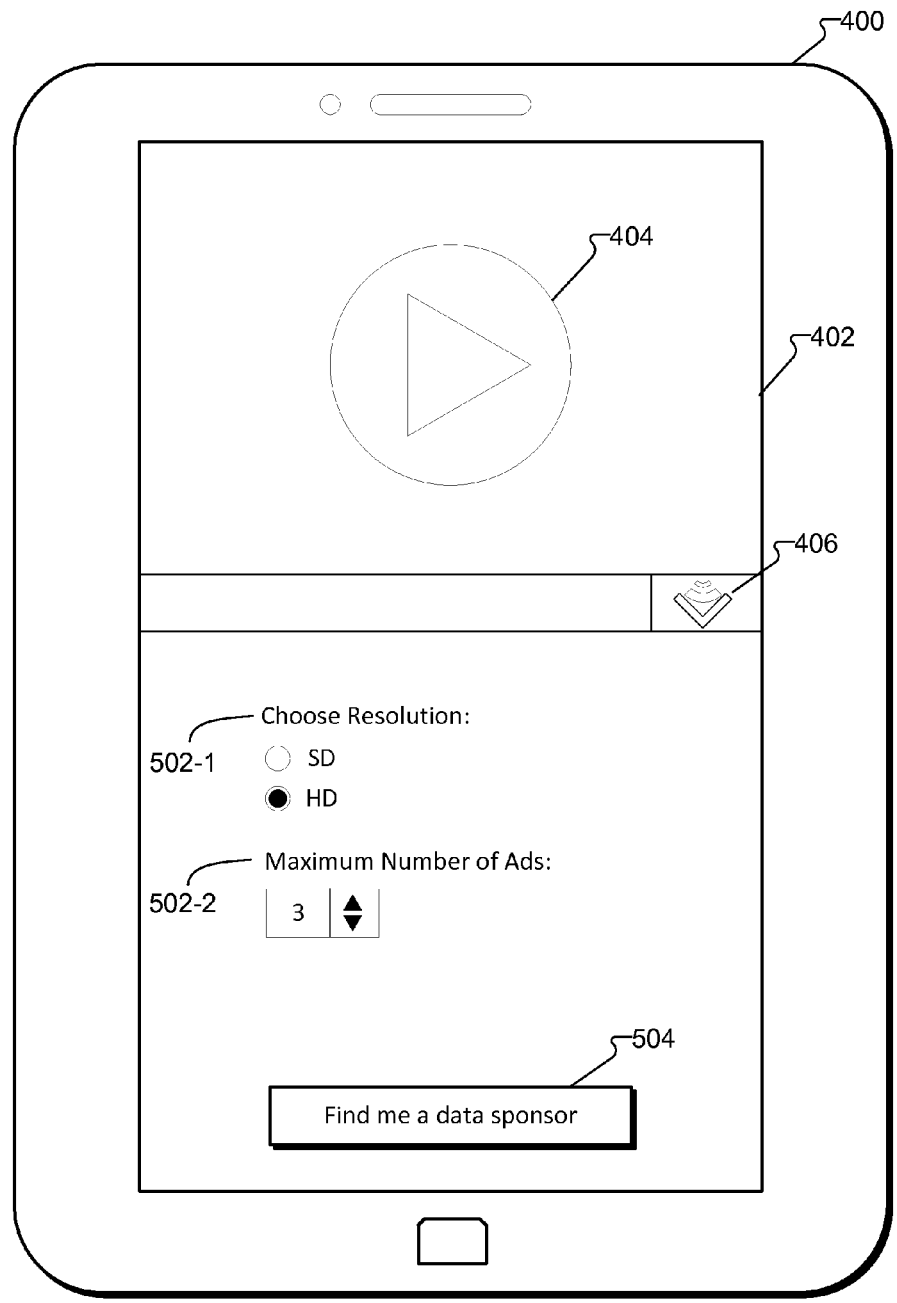

For example, FIG. 5 shows GUI 402 after the user has selected display element 406 to receive subsidized access to the network content associated with display element 404. As shown, GUI 402 has been updated to include various options 502 (e.g., options 502-1 and 502-2) that may be selected by the user in order to provide the user parameters. For example, option 502-1 shows that the user has selected "SD" as a resolution of the network content that the user is willing to experience in order to receive the subsidized access to the network content. Option 502-2 shows that the user has selected "three" as the number of advertisements that the user is willing to experience in order to receive the subsidized access to the network content.

Additional or alternative options may be presented within GUI 402 so that the user may provide additional or alternative user parameters. For example, an option may be presented within GUI 402 that allows the user to specify a total length of advertisements (e.g., a total number of seconds and/or minutes) that the user is willing to experience in order to receive the subsidized access to the network content. Additionally or alternatively, an option may be presented within GUI 402 that allows the user to specify a type of sponsor (e.g., a sponsor that specializes in a particular type of merchandise or field of trade, a sponsor that provides kid-friendly advertisement content, etc.) that the user is willing to have sponsor the subsidized access to the network content. Additionally or alternatively, an option may be presented within GUI 402 that allows the user to specify a specific sponsor (e.g., a particular company) that the user is willing to have sponsor the subsidized access to the network content. Additionally or alternatively, an option may be presented within GUI 402 that allows the user to specify a minimum download speed that the user is willing to experience in order to receive the subsidized access to the network content. Additional or alternative user parameters may be provided by the user as may serve a particular implementation.

In the example of FIGS. 4-5, the user provides the user parameters after he or she provides a request to receive subsidized access to network content (e.g., by selecting display element 406). Alternatively, the user may provide the user parameters before he or she provides the request to receive subsidized access to network content. For example, the user may specify, at some point prior to GUI 402 being displayed by access device 400, user parameters that apply generally to every time the user provides a request to receive subsidized access to network content. These general user parameters may be saved and maintained by system 100 in any suitable manner. For example, the general user parameters may be maintained as part of a user profile associated with the user and accessed every time the user provides a request to receive subsidized access to network content.

Once the user has provided the user parameters that define the conditions that the user is willing to experience in order to receive subsidized access to the network content, the user may select option 504 to submit the user parameters to system 100. System 100 may identify the specified user parameters in response to the user selection of option 504 and use the user parameters to determine whether there is a potential sponsor included in a pool of potential sponsors that is willing to sponsor the subsidized access to the network content by the user by way of access device 400 in accordance with the user parameters. This will be described in more detail below.

To facilitate selection of a sponsor that is willing to sponsor the subsidized access to the network content by the user by way of access device 400, system 100 may maintain data representative of a pool of potential sponsors. This may be performed in any suitable manner. For example, an entity associated with system 100 (e.g., a subsidized access provider) may enter into subsidized access arrangements with various potential sponsors. As mentioned, a subsidized access arrangement may include any suitable agreement, contract, and/or other arrangement in which a potential sponsor agrees to subsidize access by one or more users to network content in accordance with a plurality of sponsor parameters provided by the potential sponsor. As used herein, "sponsor parameters" provided by a potential sponsor define a plurality of conditions associated with subsidized access to network content that the potential sponsor is willing to provide in order for a user to receive the subsidized access to the network content.

To illustrate, FIG. 6 shows an exemplary GUI 600 that may be presented to a potential sponsor and that may be used by the potential sponsor to specify a plurality of sponsor parameters associated with providing subsidized access to network content. GUI 600 may be presented by way of any suitable computing device used by personnel associated with the potential sponsor.

As shown, the potential sponsor may utilize option 602-1 to specify a format of network content that the potential sponsor is willing to sponsor (e.g., online videos, full websites, specific objects, etc.). Additionally or alternatively, the potential sponsor may utilize option 602-2 to specify a total amount of data that the potential sponsor is willing to sponsor during a particular session in which a user receives subsidized access to network content. Additionally or alternatively, the potential sponsor may utilize option 602-3 to identify advertisements that are to be presented to a user while the user receives subsidized access that is sponsored by the potential sponsor. Additionally or alternatively, the potential sponsor may utilize option 602-4 to specify a maximum sponsorship budget that the sponsor is willing to spend during a particular session in which a user receives subsidized access to network content. Additionally or alternatively, the potential sponsor may utilize option 602-5 to specify a minimum amount of advertisement content that the potential sponsor is willing to provide during a particular session in which a user receives subsidized access to network content. Additionally or alternatively, the potential sponsor may utilize option 602-6 to specify a daily time range within which the potential sponsor is willing to provide subsidized access by a user to network content. Additionally or alternatively, the potential sponsor may utilize option 602-7 to specify a resolution (e.g., SD, HD, etc.) of network content that the potential sponsor is willing to sponsor during a particular session in which a user receives subsidized access to network content. Additional or alternative sponsor parameters may be specified by a potential sponsor in any suitable manner.

As mentioned, system 100 may use the user parameters provided by the user of access device 400 to determine whether there is a potential sponsor included in a pool of potential sponsors that is willing to sponsor the subsidized access to the network content by the user by way of access device 400 in accordance with the user parameters. This may be performed in any suitable manner. For example, system 100 may compare the user parameters provided by the user with different sets of sponsor parameters provided by the various sponsors included in the pool of potential sponsors. Based on the comparison, system 100 may identify a sponsor included in the pool of potential sponsors whose sponsor parameters match up with the user parameters. In other words, system 100 may identify a sponsor whose sponsor parameters indicate that the sponsor is willing to sponsor the subsidized access to the network content by the user by way of access device 400 in accordance with the user parameters. In this manner, the selection of the sponsor may be based on both the user parameters and the sponsor parameters.

In some examples, the selection of the sponsor may be further based on a set of sponsorship criteria provided by the subsidized access provider. For example, system 100 may initially identify a plurality of sponsors whose respective sponsor parameters indicate that each of the plurality of sponsors are willing to sponsor the subsidized access to the network content by the user by way of access device 400 in accordance with the user parameters. In this scenario, system 100 may designate a particular sponsor included in the plurality of identified sponsors and that best satisfies a set of sponsorship criteria provided by the subsidized access provider as the sponsor that is ultimately selected to sponsor the subsidized access by the user to the network content.

As used herein, "sponsorship criteria" refers to any factor specified by the subsidized access provider associated with system 100 and that may assist in selecting, from a plurality of sponsors that are willing to sponsor subsidized access by a user to network content, a particular sponsor as the sponsor that will actually sponsor the subsidized access by the user to the network content. For example, the sponsorship criteria may include a distance of the sponsor from the user, a physical location of the sponsor, a connection between the sponsor and the network content, a field of trade of the sponsor, a correlation of a user profile associated with the user to demographic information of the sponsor, and/or any other criterion as may serve a particular implementation.

To illustrate, a user may request subsidized access to a streaming video of a local sporting event. System 100 may determine that multiple potential sponsors are willing to provide the subsidized access in accordance with user parameters provided by the user. In this scenario, system 100 may determine which sponsor included in the multiple potential sponsors best satisfies one or more sponsorship criteria provided by the subsidized access provider. For example, system 100 may determine that a particular sponsor is closer in distance to the user than the other sponsors and accordingly select the particular sponsor as the sponsor that will sponsor the subsidized access by the user to the streaming video. Alternatively, system 100 may determine that a field of trade of a particular sponsor is most related to the streaming video of the local sporting event and accordingly select the particular sponsor as the sponsor that will sponsor the subsidized access by the user to the streaming video. For example, system 100 may select a sporting goods store as the sponsor for the subsidized access by the user to the streaming video based on the sporting goods store's connection to the local sporting event.

System 100 may additionally or alternatively select a particular sponsor from a plurality of potential sponsors that are all willing to sponsor the subsidized access to the network content by the user in any other suitable manner. For example, system 100 may conduct a real-time bidding process between the plurality of potential sponsors. The real-time bidding process may be performed by system 100 in any manner as may serve a particular implementation. For example, the real-time bidding process may include an auction conducted by system 100 wherein system 100 selects a particular sponsor that is willing to pay the subsidized access provider the most amount of money in order to be selected as the sponsor for the subsidized access.

In some examples, the user does not have to provide user parameters in order to receive subsidized access to network content by way of an access device. For example, the user may simply provide a request, in any of the ways described herein, for the user to receive subsidized access to network content by way of an access device. In response, system 100 may identify a plurality of sponsors from a pool of potential sponsors and that are willing to sponsor the subsidized access to the network content by the user by way of the access device. System 100 may then select a sponsor included in the plurality of sponsors and that is a best match for the subsidized access. System 100 may then provide, in response to selecting the sponsor that is the best match, the user with the subsidized access to the network content by way of the access device in accordance with a subsidized access arrangement between the subsidized access provider and the sponsor.

System 100 may select a sponsor that is a "best match" for subsidized access by a user to network content in any suitable manner. For example, as described above, system 100 may conduct a real-time bidding process between the plurality of potential sponsors and select a sponsor that is a highest bidder from among the plurality of sponsors. System 100 may then designate the sponsor that is the highest bidder as the sponsor that is the best match for the subsidized access. Additionally or alternatively, system 100 may select a sponsor that is a best match for subsidized access by a user to network content by selecting a particular sponsor that has the most relevant advertisement content with respect to the network content, a particular sponsor that is willing to sponsor the subsidized access with the least amount of advertisement time, etc. The selection of the sponsor that is the best match may, in some examples, also be based on user parameters provided by the user, as described herein.

In some examples, in response to a sponsor being selected to sponsor the subsidized access to the network content by the user by way of access device 400, system 100 may notify the user that the sponsor has been selected. This may be performed in any suitable manner. For example, system 100 may display, within GUI 402, a notification that provides confirmation that the subsidized access to the network content is being sponsored.

Figure 7:
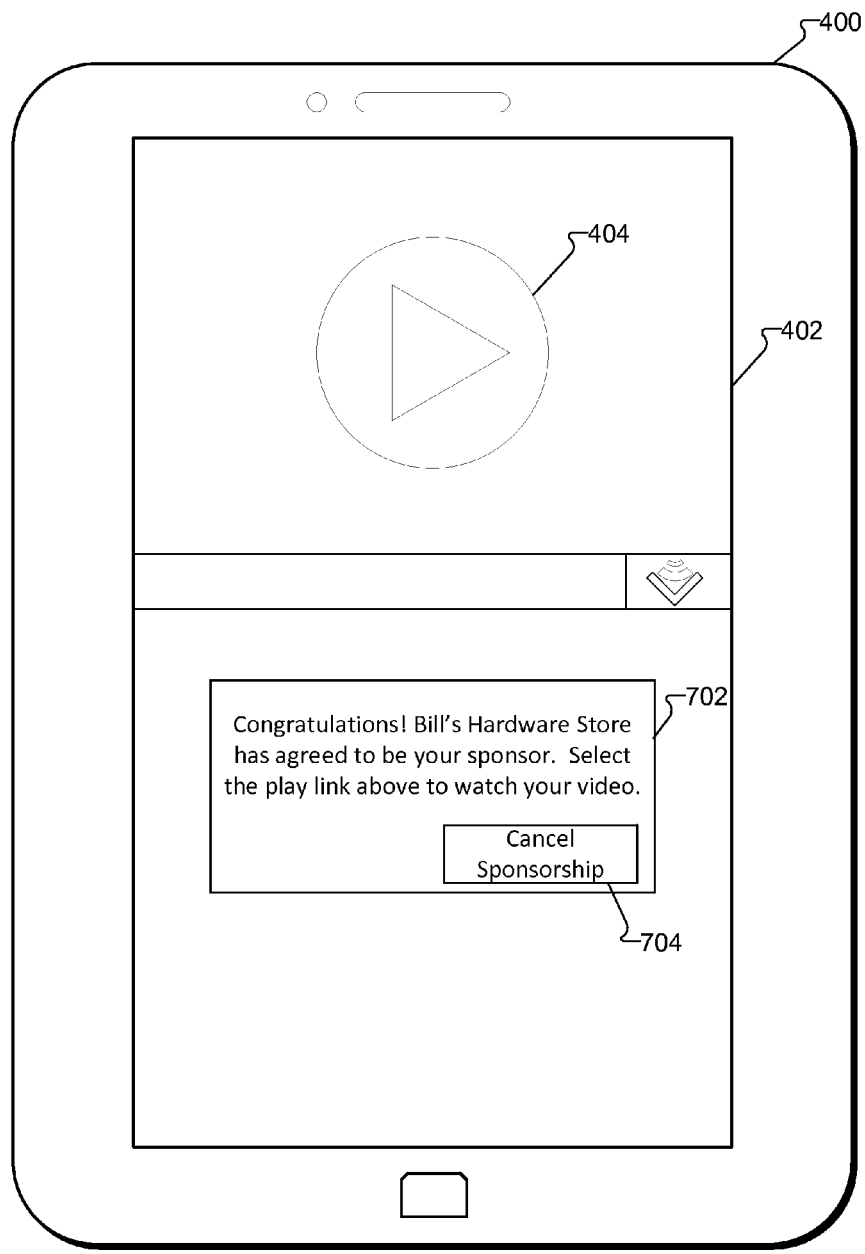

To illustrate, FIG. 7 shows GUI 402 after system 100 has selected a sponsor to sponsor access by the user to the network content associated with display element 404. As shown, GUI 402 includes a notification 702 displayed therein. Notification 702 indicates to the user that a sponsor named "Bill's Hardware Store" has been selected as the sponsor for subsidized access to the network content associated with display element 404. It will be recognized that notification 702 may include additional or alternative information as may serve a particular implementation. For example, notification 702 may indicate what type of subsidized access is being provided (e.g., that the sponsor is subsidizing all or part of the access by the user to the network content). In some examples, the user may select an option 704 provided within notification 702 in order to cancel the sponsorship and revert back to unsubsidized access to the network content.

Once a sponsor has been selected to sponsor the subsidized access to the network content by the user by way of access device 400, system 100 may provide the user with the subsidized access to the network content by way of access device 400 in accordance with a subsidized access arrangement between the subsidized access provider and the sponsor. This may be performed in any suitable manner. For example, system 100 may collect payment from the sponsor to cover the subsidized access in accordance with one or more terms specified in the subsidized access arrangement between the subsidized access provider and the sponsor.

In some examples, system 100 may provide the user with the subsidized access to the network content by way of access device 400 by presenting advertising content provided by the sponsor together with the network content by way of access device 400 in accordance with the subsidized access arrangement between the subsidized access provider and the sponsor. The advertisement content maybe presented together with the network content in any suitable manner. For example, user may be required to view (or otherwise experience) the advertising content before being able to access the network content that is being subsidized. In other examples, advertising content may be displayed within GUI 402 during or after the time that the user accesses the network content that is being subsidized. For example, a logo associated with the sponsor may be overlaid on top of the network content while the network content is being accessed by the user.

In some examples, the user may be required to answer questions and/or provide any other type of user feedback related to the advertising content and/or the network content in order to receive the subsidized access to the network content. System 100 may receive the user feedback and, in some examples, forward the user feedback to the sponsor.

In some examples, system 100 may be unable to identify a sponsor that is willing to sponsor subsidized access by a user to network content in accordance with user parameters provided by the user. For example, the user may provide user parameters that are not acceptable to any sponsor included in the pool of potential sponsors. In this case, system 100 may notify the user that no sponsor is willing to sponsor subsidized access to the network content. Additionally or alternatively, system 100 may provide the user with a counter-offer for sponsorship. The user may accept the counter-offer in order to receive subsidized access to the network content.

For example, the user may provide a user parameter that the user is only willing to experience ten seconds of advertisement content in exchange for subsidized access to a particular instance of network content. System 100 may determine that no sponsor included in the pool of potential sponsors is willing to sponsor subsidized access for only ten seconds of advertisement content. However, system 100 may identify a particular sponsor that is willing to sponsor the subsidized access in exchange for thirty seconds of advertisement content. Accordingly, system 100 may provide the user with a counter-offer that indicates that the particular sponsor is willing to sponsor subsidized access to the network content if the user is willing to experience thirty seconds (instead of ten seconds) of advertisement content.

Figure 8:
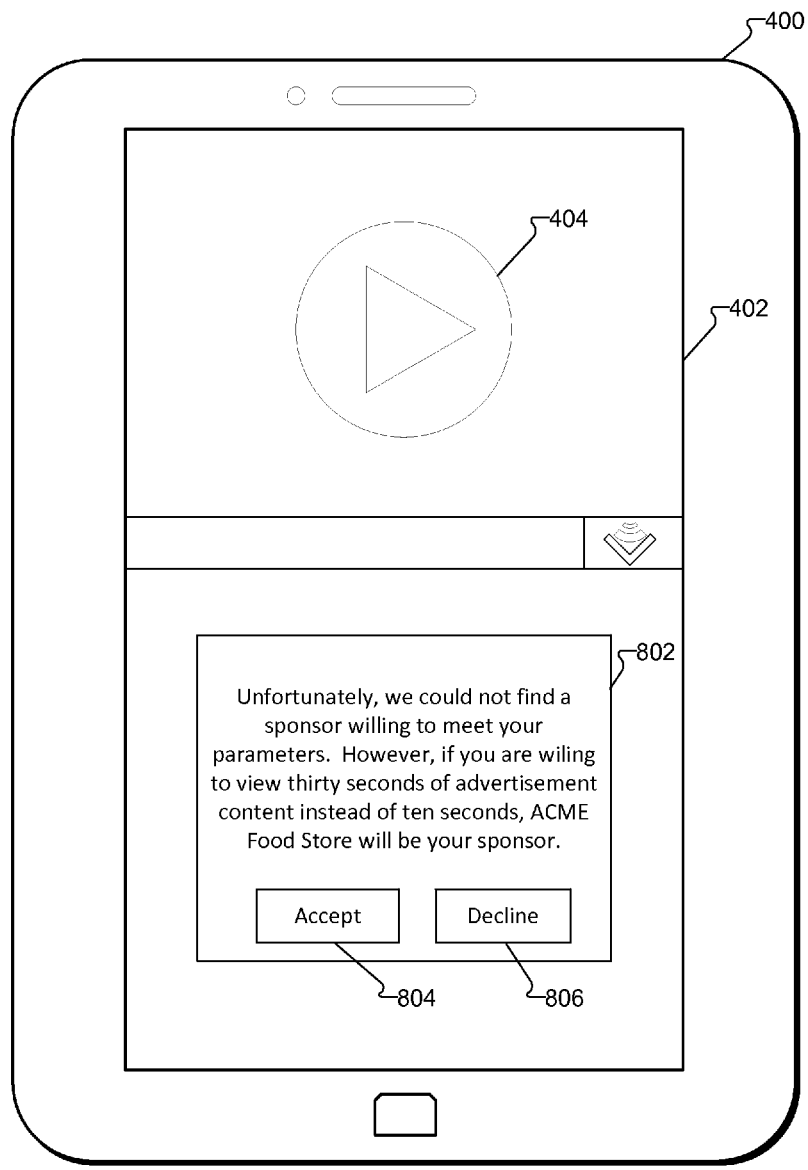

FIG. 8 shows an exemplary notification 802 that may be displayed within GUI 402 and that may include the counter-offer described above. As shown, notification 802 indicates to the user that system 100 could not identify a sponsor willing to meet the user parameters originally input by the user. Notification 802 further provides the user with a counter-offer that indicates that a particular sponsor named "ACME Food Store" is willing to sponsor subsidized access to the network content if the user is willing to experience thirty seconds of advertisement content instead of ten seconds as originally proposed by the user. As shown, notification 802 includes an "accept" option 804 that the user may select in order to accept the counter-offer and a "decline" option 806 that the user may select in order to decline the counter-offer.

Figure 9:
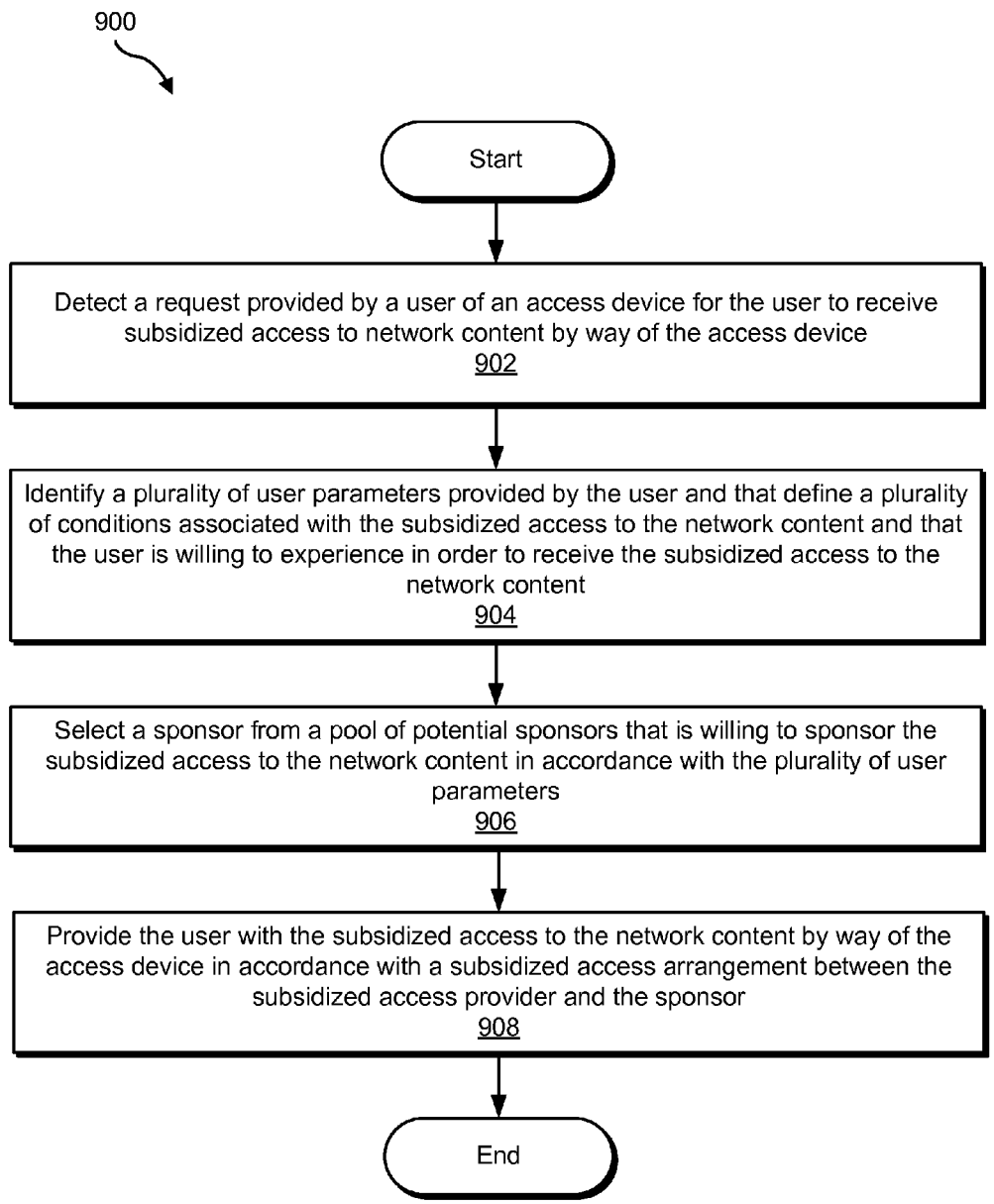
FIG. 9 illustrates an exemplary method of facilitating subsidized access to network content based on user-provided parameters according to principles described herein.

FIG. 9 illustrates an exemplary method 900 of facilitating subsidized access to network content based on user-provided parameters. While FIG. 9 illustrates exemplary operations according to one embodiment, other embodiments may omit, add to, reorder, and/or modify any of the operations shown in FIG. 9. One or more of the operations shown in FIG. 9 may be performed by system 100 and/or any implementation thereof.

In operation 902, a subsidized access management system detects a request provided by a user of an access device for the user to receive subsidized access to network content by way of the access device. As described above, the network content is associated with a content provider and maintained by a content provider system. Operation 902 may be performed in any of the ways described herein.

In operation 904, the subsidized access management system identifies a plurality of user parameters provided by the user and that define a plurality of conditions associated with the subsidized access to the network content and that the user is willing to experience in order to receive the subsidized access to the network content. Operation 904 may be performed in any of the ways described herein.

In operation 906, the subsidized access management system selects a sponsor from a pool of potential sponsors that is willing to sponsor the subsidized access to the network content in accordance with the plurality of user parameters. Operation 906 may be performed in any of the ways described herein.

In operation 908, the subsidized access management system provides the user with the subsidized access to the network content by way of the access device in accordance with a subsidized access arrangement between the subsidized access provider and the sponsor. Operation 908 may be performed in any of the ways described herein.

Figure 10:
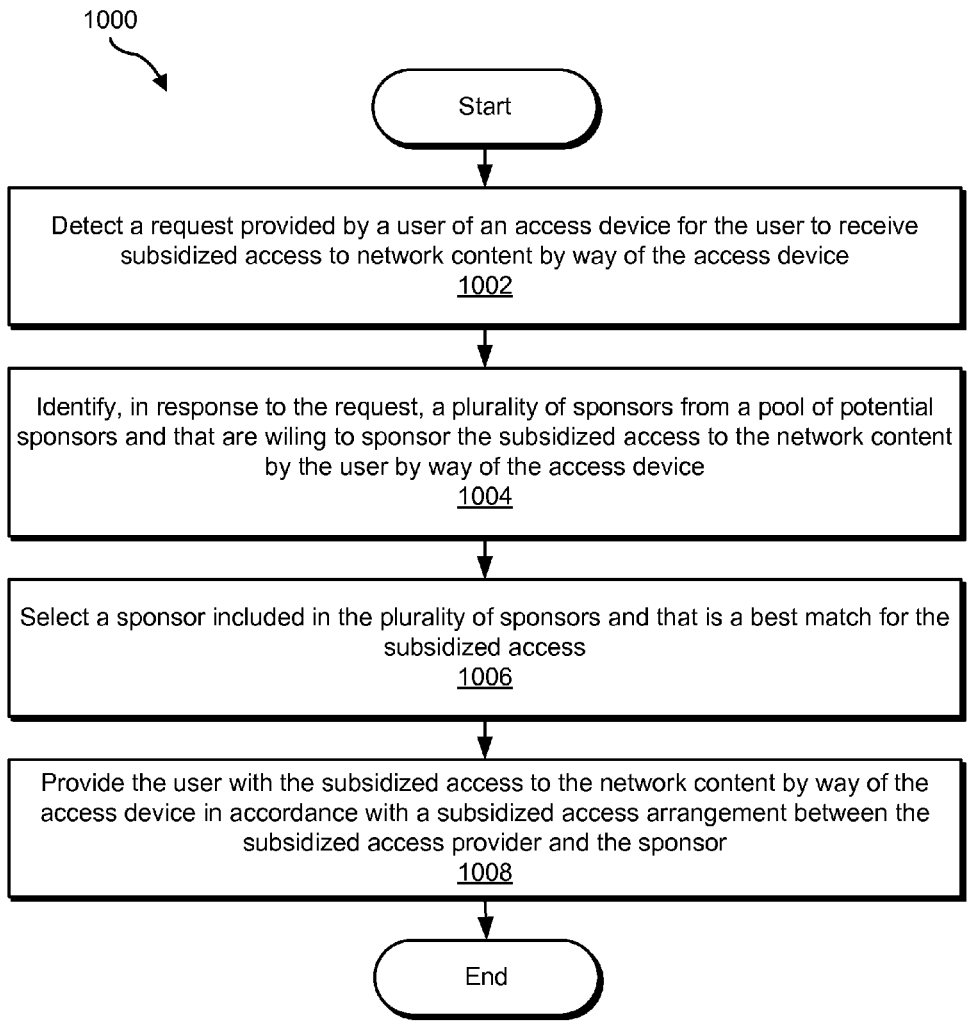
FIG. 10 illustrates an exemplary method of facilitating subsidized access to network content according to principles described herein.

FIG. 10 illustrates an exemplary method 1000 of facilitating subsidized access to network content. While FIG. 10 illustrates exemplary operations according to one embodiment, other embodiments may omit, add to, reorder, and/or modify any of the operations shown in FIG. 10. One or more of the operations in FIG. 10 may be performed by system 100 and/or any implementation thereof.

In operation 1002, a subsidized access management system associated with a subsidized access provider detects a request provided by a user of an access device for the user to receive subsidized access to network content by way of the access device. As described above, the network content may be provided by a content provider and maintained by a content provider server. Operation 1002 may be performed in any of the ways described herein.

In operation 1004, the subsidized access management system identifies, in response to the request, a plurality of sponsors from a pool of potential sponsors and that are willing to sponsor the subsidized access to the network content by the user by way of the access device. Operation 1004 may be performed in any of the ways described herein.

In operation 1006, the subsidized access management system selects a sponsor included in the plurality of sponsors and that is a best match for the subsidized access. Operation 1006 may be performed in any of the ways described herein.

In operation 1008, the subsidized access management system provides, in response to the selecting of the sponsor, the user with the subsidized access to the network content by way of the access device in accordance with a subsidized access arrangement between the subsidized access provider and the sponsor. Operation 1008 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
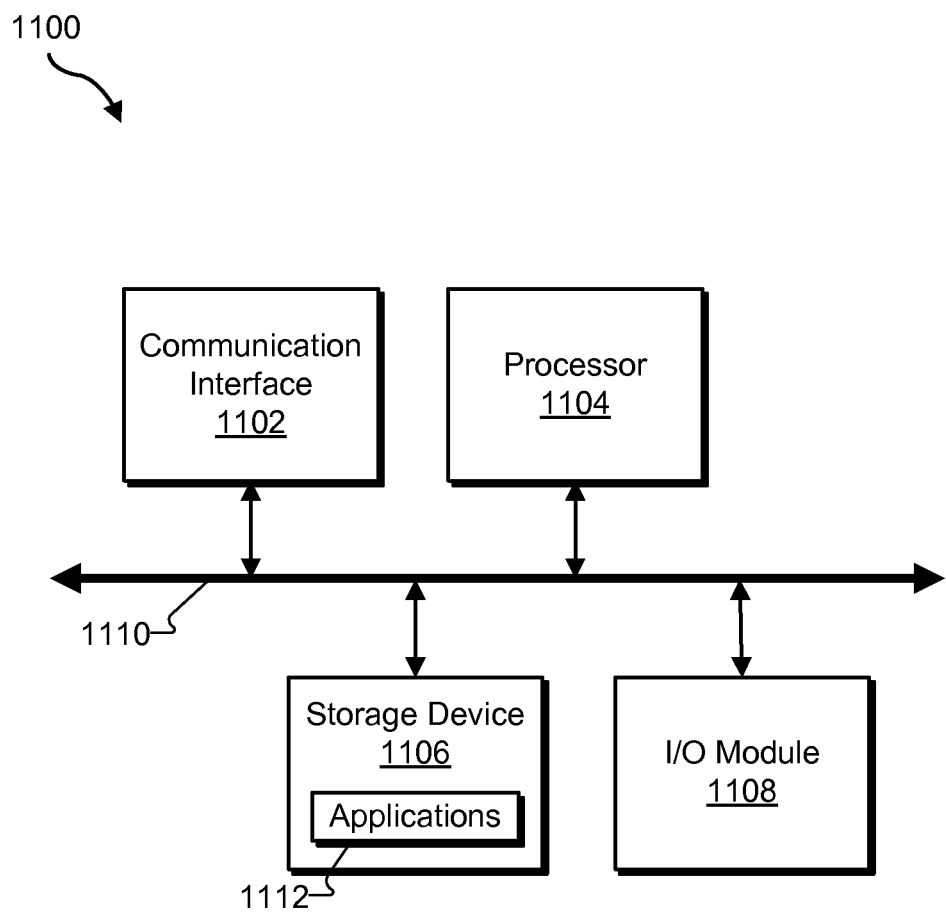
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with detection facility 102 and management facility 104. Likewise, storage facility 106 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by a subsidized access management system associated with a subsidized access provider, a request provided by a user of an access device for the user to receive subsidized access to network content by way of the access device;
    identifying, by the subsidized access management system in response to the request, a plurality of user parameters provided by the user and that define a plurality of conditions associated with the subsidized access to the network content and that the user is willing to experience in order to receive the subsidized access to the network content;
    selecting, by the subsidized access management system based on the plurality of user parameters, a sponsor from a pool of potential sponsors and that is willing to sponsor the subsidized access to the network content by the user by way of the access device in accordance with the plurality of user parameters; and
    providing, by the subsidized access management system in response to the selecting of the sponsor, the user with the subsidized access to the network content by way of the access device in accordance with a subsidized access arrangement between the subsidized access provider and the sponsor;
    wherein the selecting of the sponsor from the pool of potential sponsors is further based on a real-time bidding process between two or more potential sponsors within the pool of potential sponsors and that are willing to sponsor the subsidized access to the network content by way of the access device in accordance with the plurality of user parameters.

2. The method of claim 1, further comprising notifying, by the subsidized access management system in response to the selecting of the sponsor, the user that the sponsor has been selected from the pool of potential sponsors and that the sponsor is willing to sponsor the subsidized access to the network content by the user by way of the access device in accordance with the plurality of user parameters.

3. The method of claim 2, wherein the notifying comprises displaying a notification within a graphical user interface displayed by way of the access device, wherein the notification provides confirmation that the subsidized access to the network content is being sponsored.

4. The method of claim 1, wherein a first display element linked to the network content and a second display element representative of a selectable option to request to receive subsidized access to the network content are concurrently presented within a graphical user interface that is displayed by the access device, and wherein the detecting of the request provided by the user comprises detecting that the user selects the second display element.

5. The method of claim 4, wherein the user would not receive the subsidized access to the network content if the user were to select the first display element without first selecting the second display element.

6. The method of claim 1, wherein the selecting of the sponsor from the pool of potential sponsors is further based on a set of sponsorship criteria provided by the subsidized access provider.

7. The method of claim 6, wherein the set of sponsorship criteria comprises one or more of a distance of each potential sponsor included in the pool of potential sponsors from the user, a physical location of each potential sponsor included in the pool of potential sponsors, a connection between each potential sponsor included in the pool of potential sponsors and the network content, a field of trade of each potential sponsor included in the pool of potential sponsors, and a correlation of a user profile associated with the user to demographic information of each potential sponsor included in the pool of potential sponsors.

8. The method of claim 1, wherein the plurality of user parameters provided by the user comprises one or more of a resolution of the network content that the user is willing to experience in order to receive the subsidized access to the network content, a maximum number of advertisements that the user is willing to experience in order to receive the subsidized access to the network content, a total length of advertisements that the user is willing to experience in order to receive the subsidized access to the network content, a type of sponsor that the user is willing to have sponsor the subsidized access to the network content, a specific potential sponsor that the user is willing to have sponsor the subsidized access to the network content, and a minimum download speed that the user is willing to experience in order to receive the subsidized access to the network content.

9. The method of claim 1, wherein the providing of the subsidized access to the network content comprises presenting advertising content provided by the sponsor together with the network content by way of the access device in accordance with the subsidized access arrangement between the subsidized access provider and the sponsor.

10. The method of claim 9, further comprising:
receiving, by the subsidized access management system in response to the providing of the subsidized access to the network content to the user, user feedback related to at least one of the advertising content and the network content; and
providing, by the subsidized access management system in response to the receiving of the user feedback, the user feedback to the sponsor.

11. The method of claim 1, wherein the selecting of the sponsor from the pool of potential sponsors is further based on a plurality of sponsor parameters provided by each potential sponsor within the pool of potential sponsors and that define a plurality of conditions associated with the subsidized access to the network content and that the potential sponsor is willing to provide in order for the user to receive the subsidized access to the network content.

12. The method of claim 11, wherein the plurality of sponsor parameters provided by each potential sponsor included in the pool of potential sponsors comprises one or more of a resolution of the network content that the potential sponsor is willing to sponsor during the subsidized access to the network content, a minimum amount of advertisement content that the potential sponsor is willing to provide during the subsidized access to the network content, a format of the network content that the potential sponsor is willing to provide during the subsidized access to the network content, a total amount of data that the potential sponsor is willing to sponsor during the subsidized access to the network content, and a maximum sponsorship budget that the sponsor is willing to spend to sponsor the subsidized access to the network content.

13. The method of claim 1, embodied as computer-executable instructions on at least one non-transitory computer-readable medium.

14. A method comprising:
detecting, by a subsidized access management system associated with a subsidized access provider, a request provided by a user of an access device for the user to receive subsidized access to network content by way of the access device;
identifying, by the subsidized access management system in response to the request, a plurality of sponsors from a pool of potential sponsors and that are willing to sponsor the subsidized access to the network content by the user by way of the access device;
selecting, by the subsidized access management system, a sponsor included in the plurality of sponsors and that is a best match for the subsidized access; and
providing, by the subsidized access management system in response to the selecting of the sponsor, the user with the subsidized access to the network content by way of the access device in accordance with a subsidized access arrangement between the subsidized access provider and the sponsor;
wherein the selecting of the sponsor that is the best match for the subsidized access comprises:
conducting, in response to the identifying of the plurality of sponsors, a real-time bidding process among the plurality of sponsors;
selecting, based on the real-time bidding process, a sponsor that is a highest bidder from among the plurality of sponsors; and
designating the sponsor that is the highest bidder as the sponsor that is the best match for the subsidized access.

15. The method of claim 14, further comprising:
identifying, by the subsidized access management system in response to the request, a plurality of user parameters provided by the user and that define a plurality of conditions associated with the subsidized access to the network content and that the user is willing to experience in order to receive the subsidized access to the network content;
wherein the identifying of the plurality of sponsors that are willing to sponsor the subsidized access comprises
identifying a set of sponsors included in the pool of potential sponsors and that are willing to sponsor the subsidized access in accordance with the plurality of user parameters, and
designating the set of sponsors as the plurality of sponsors that are willing to sponsor the subsidized access.

16. The method of claim 14, embodied as computer-executable instructions on at least one non-transitory computer-readable medium.

17. A system comprising:
at least one physical device that:
detects a request provided by a user of an access device for the user to receive subsidized access to network content by way of the access device,
identifies a plurality of user parameters provided by the user and that define a plurality of conditions associated with the subsidized access to the network content and that the user is willing to experience in order to receive the subsidized access to the network content,
selects a sponsor from a pool of potential sponsors and that is willing to sponsor the subsidized access to the network content by the user by way of the access device in accordance with the plurality of user parameters, and
provides the user with the subsidized access to the network content by way of the access device in accordance with a subsidized access arrangement between a subsidized access provider and the sponsor;
wherein the selection of the sponsor from the pool of potential sponsors is further based on a real-time bidding process between two or more potential sponsors within the pool of potential sponsors and that are willing to sponsor the subsidized access to the network content by way of the access device in accordance with the plurality of user parameters.

18. The system of claim 17, wherein the at least one physical device notifies, in response to the selection of the sponsor, the user that the sponsor has been selected from the pool of potential sponsors and that the sponsor is willing to sponsor the subsidized access to the network content by the user by way of the access device in accordance with the plurality of user parameters.

19. The system of claim 17, wherein a first display element linked to the network content and a second display element representative of a selectable option to request to receive subsidized access to the network content are concurrently presented within a graphical user interface that is displayed by the access device, and wherein the at least one physical device detects the request provided by the user by detecting that the user selects the second display element.

20. The system of claim 19, wherein the selection of the sponsor from the pool of potential sponsors is further based on a plurality of sponsor parameters provided by each potential sponsor within the pool of potential sponsors and that define a plurality of conditions associated with the subsidized access to the network content and that the potential sponsor is willing to provide in order for the user to receive the subsidized access to the network content.

* * * * *